(12) United States Patent
He et al.

(10) Patent No.: US 11,789,298 B2
(45) Date of Patent: Oct. 17, 2023

(54) DISPLAY DEVICE

(71) Applicant: Wuhan China Star Optoelectronics Technology Co., Ltd., Hubei (CN)

(72) Inventors: Rui He, Hubei (CN); Wei Cheng, Hubei (CN); Changchih Huang, Hubei (CN); Guanghui Liu, Hubei (CN)

(73) Assignee: Wuhan China Star Optoelectronics Technology Co., Ltd., Wuhan (CN)

( * ) Notice: Subject to any disclaimer, the term of this patent is extended or adjusted under 35 U.S.C. 154(b) by 295 days.

(21) Appl. No.: 17/281,591

(22) PCT Filed: Mar. 11, 2021

(86) PCT No.: PCT/CN2021/080283
§ 371 (c)(1),
(2) Date: Mar. 31, 2021

(87) PCT Pub. No.: WO2022/178921
PCT Pub. Date: Sep. 1, 2022

(65) Prior Publication Data
US 2023/0152614 A1 May 18, 2023

(30) Foreign Application Priority Data

Feb. 24, 2021 (CN) .......................... 202110204077.0

(51) Int. Cl.
*G02F 1/13* (2006.01)
*G02F 1/1343* (2006.01)
(Continued)

(52) U.S. Cl.
CPC ............ *G02F 1/1323* (2013.01); *G02F 1/137* (2013.01); *G02F 1/1334* (2013.01);
(Continued)

(58) Field of Classification Search
CPC .... G02F 2203/48; G02F 1/1323; G02F 1/137; G02F 1/13338; G06V 40/12; G06K 9/00006; G06K 9/00
See application file for complete search history.

(56) References Cited

U.S. PATENT DOCUMENTS

2009/0059105 A1 3/2009 Colella
2020/0341314 A1* 10/2020 Jung ................. G02F 1/134309
(Continued)

FOREIGN PATENT DOCUMENTS

CN 108885376 11/2018
CN 109782464 A * 5/2019
(Continued)

OTHER PUBLICATIONS

Xin, English translation of CN-110764291-A (Year: 2022).*
Wang, English translation of CN-109782464-A (Year: 2019).*

*Primary Examiner* — Jonathan Y Jung

(57) ABSTRACT

A display device provided includes a display panel, a first backlight module, a second backlight module, a light sensor, and a viewing angle adjusting component. The first backlight module includes an optical element, and the viewing angle adjusting component is disposed corresponding to a display sensing area. When the optical element is in a fog state, the viewing angle adjusting component reduces an exit angle of backlight. When the optical element is in a transparent state, external light enters the light sensor through the viewing angle adjusting component and the first backlight module, which improves uniformity of backlight viewing angle.

14 Claims, 6 Drawing Sheets

(51) Int. Cl.
*G02F 1/137* (2006.01)
*G02F 1/1334* (2006.01)

(52) U.S. Cl.
CPC .... *G02F 1/134345* (2021.01); *G02F 2202/04* (2013.01); *G02F 2203/48* (2013.01)

(56) References Cited

U.S. PATENT DOCUMENTS

2021/0048702 A1\* 2/2021 Yuan ................. G02F 1/133753
2021/0072599 A1\* 3/2021 Mei ................... G02F 1/133626

FOREIGN PATENT DOCUMENTS

| CN | 110456538 | | 11/2019 | |
| --- | --- | --- | --- | --- |
| CN | 110703499 A | \* | 1/2020 | ....... G02F 1/133528 |
| CN | 110764291 | | 2/2020 | |
| CN | 110780477 | | 2/2020 | |
| CN | 110908189 | | 3/2020 | |
| CN | 210270454 | | 4/2020 | |
| CN | 111352268 | | 6/2020 | |
| CN | 111752027 | | 10/2020 | |
| CN | 110764291 A | \* | 6/2022 | ........... G02F 1/1323 |
| CN | 110764291 B | \* | 6/2022 | ........... G02F 1/1323 |

\* cited by examiner

DISPLAY DEVICE

RELATED APPLICATIONS

This application is a National Phase of PCT Patent Application No. PCT/CN2021/080283 having International filing date of Mar. 11, 2021, which claims the benefit of priority of Chinese Patent Application No. 202110204077.0 filed on Feb. 24, 2021. The contents of the above applications are all incorporated by reference as if fully set forth herein in their entirety.

FIELD AND BACKGROUND OF THE INVENTION

The present invention relates to a field of display technology, and more particularly, to a display device.

Currently, liquid crystal displays (LCDs) are widely used in high-definition digital televisions, desktop computers, personal digital assistants (PDAs), notebook computers, digital cameras and other electronic devices.

Especially in a field of small and medium-sized liquid crystal displays, under-screen sensor technology and transparent display technology have become developed in the industry.

In under-screen sensor technology, a special design of backlight module is required. For example, a common backlight module is paired with a transparent backlight module, so that signal light can reach a sensor area under the screen through the transparent backlight module to realize corresponding recognition function. However, when the transparent backlight module is simply used to provide backlight for the sensor area under the screen, light diverges severely, which causes brightness of this area to be dark, resulting in uneven viewing angles.

Therefore, there is an urgent need to provide a display device to solve the above-mentioned technical problems.

SUMMARY OF THE INVENTION

A display device provided to solves the above-mentioned technical problems that the use of a transparent backlight module in a conventional display device easily causes uneven viewing angles when displaying images in the under-screen sensor technology.

A display device comprises:

a display panel including at least one display sensing area and a main display area surrounding the display sensing area;

a first backlight module including an optical element, and at least a part of the optical element completely faces the display sensing area, and the optical element is configured to switch between a fog state and a transparent state;

a second backlight module disposed corresponding to the main display area;

a light sensor disposed on a side of the first backlight module away from the display panel and corresponding to the display sensing area; and a viewing angle adjusting component disposed between the display panel and the light sensor and corresponding to the display sensing area, and the viewing angle adjusting component comprises a dimming area and a light transmitting area that are alternately arranged at intervals;

when the optical element is in the fog state, the viewing angle adjusting component is configured to adjust the exit angle of the backlight passing through the viewing angle adjusting component; and when the optical element is in the transparent state, external light enters the light sensor through the viewing angle adjusting component and the first backlight module, and the light sensor functions.

In one embodiment, the viewing angle adjusting component comprises:

a first substrate;

a second substrate disposed opposite to the first substrate;

a transparent medium layer disposed between the first substrate and the second substrate, and the transparent medium layer is provided with a plurality of first through holes at intervals, and the plurality of first through holes are filled with a liquid crystal dye layer to form a dimming structure, the liquid crystal dye layer comprises liquid crystal molecules and dye molecules;

a first electrode disposed on a side of the first substrate facing the second substrate; and a second electrode disposed on a side of the second substrate facing the first substrate;

when the optical element is in the fog state, a longitudinal axis of the liquid crystal molecules in plurality of dimming structures are perpendicular to the first substrate; and when the optical element is in the transparent state, the longitudinal axis of the liquid crystal molecules in plurality of the dimming structures are parallel to the first substrate.

In one embodiment, the first electrode comprises a plurality of first sub-electrodes arranged at intervals, the second electrode comprises a plurality of second sub-electrodes arranged at intervals, and each of the first sub-electrodes is arranged corresponding to one of the second sub-electrodes, and a plurality of the first sub-electrodes and a plurality of the second sub-electrodes are disposed corresponding to a plurality of the dimming structures.

In one embodiment, the transparent medium layer further comprises a plurality of second through holes, each of the second through holes intersects and communicates with a plurality of the first through holes; a plurality of the first through holes and the second through holes are filled with the liquid crystal molecules and the dye molecules to form the dimming structure.

In one embodiment, an orthographic projection of each of the first through holes on the transparent medium layer is elongated and extends in a first direction, and an orthographic projection of each of the second through holes on the transparent medium layer is elongated and extends in a second direction; and the first direction and the second direction are perpendicular to each other.

In one embodiment, a shrinking viewing angle adjusted by the viewing angle adjusting component is θ=arctan[(p−w)/h], and w is a width of the first through hole, p is a period length of the first through hole, and h is a height of the first through hole.

In one embodiment, the liquid crystal molecules are positive liquid crystal molecules or negative liquid crystal molecules, and the dye molecules are positive dye molecules or negative dye molecules.

In one embodiment, the viewing angle adjusting component is located on a side of the optical element close to the display panel, and the optical element is located between the viewing angle adjusting component and the light sensor.

In one embodiment, the viewing angle adjusting component is located on a side of the optical element away from the display panel, and the viewing angle adjusting component is located between the optical element and the light sensor.

In one embodiment, the optical element is disposed corresponding to the main display area and the display sensing area.

A display device comprises:

a display panel including at least one display sensing area and a main display area surrounding the display sensing area;

a first backlight module including an optical element, and at least a part of the optical element completely faces the display sensing area, and the optical element is switched between a fog state and a transparent state;

a second backlight module disposed corresponding to the main display area;

a light sensor disposed on a side of the first backlight module away from the display panel and corresponding to the display sensing area; and a viewing angle adjusting component disposed between the display panel and the light sensor and corresponding to the display sensing area;

when the optical element is in the fog state, the viewing angle adjusting component is configured to adjust the exit angle of the backlight passing through the viewing angle adjusting component; and when the optical element is in the transparent state, external light enters the light sensor through the viewing angle adjusting component and the first backlight module, and the light sensor functions.

In one embodiment, the viewing angle adjusting component comprises:

a first substrate;

a second substrate disposed opposite to the first substrate;

a transparent medium layer disposed between the first substrate and the second substrate, and the transparent medium layer is provided with a plurality of first through holes at intervals, and the plurality of first through holes are filled with a liquid crystal dye layer to form a dimming structure, the liquid crystal dye layer comprises liquid crystal molecules and dye molecules;

a first electrode disposed on a side of the first substrate facing the second substrate; and a second electrode disposed on a side of the second substrate facing the first substrate;

when the optical element is in the fog state, a longitudinal axis of the liquid crystal molecules in plurality of dimming structures are perpendicular to the first substrate; and when the optical element is in the transparent state, the longitudinal axis of the liquid crystal molecules in plurality of the dimming structures are parallel to the first substrate.

In one embodiment, the first electrode comprises a plurality of first sub-electrodes arranged at intervals, the second electrode comprises a plurality of second sub-electrodes arranged at intervals, and each of the first sub-electrodes is arranged corresponding to one of the second sub-electrodes, and a plurality of the first sub-electrodes and a plurality of the second sub-electrodes are disposed corresponding to a plurality of the dimming structures.

In one embodiment, the transparent medium layer further comprises a plurality of second through holes, each of the second through holes intersects and communicates with a plurality of the first through holes; a plurality of the first through holes and the second through holes are filled with the liquid crystal molecules and the dye molecules to form the dimming structure.

In one embodiment, an orthographic projection of each of the first through holes on the transparent medium layer is elongated and extends in a first direction, and an orthographic projection of each of the second through holes on the transparent medium layer is elongated and extends in a second direction; and the first direction and the second direction are perpendicular to each other.

In one embodiment, a shrinking viewing angle adjusted by the viewing angle adjusting component is $\theta=\arctan[(p-w)/h]$, and w is a width of the first through hole, p is a period length of the first through hole, and h is a height of the first through hole.

In one embodiment, the liquid crystal molecules are positive liquid crystal molecules or negative liquid crystal molecules, and the dye molecules are positive dye molecules or negative dye molecules.

In one embodiment, the viewing angle adjusting component is located on a side of the optical element close to the display panel, and the optical element is located between the viewing angle adjusting component and the light sensor.

In one embodiment, the viewing angle adjusting component is located on a side of the optical element away from the display panel, and the viewing angle adjusting component is located between the optical element and the light sensor.

In one embodiment, the optical element is disposed corresponding to the main display area and the display sensing area.

The viewing angle adjusting component comprises an optical element, which can switch between the fog state and the transparent state. When the optical element is in the fog state, the viewing angle adjusting component can reduce the exit angle of the backlight through the viewing angle adjusting component, which improves the uniformity of the backlight viewing angle of the first backlight module, so as to improve the display effect. When the optical element is in the transparent state, external light enters the light sensor through the viewing angle adjusting component and the first backlight module to perform the function of the light sensor. Without affecting the function of the light sensor, the uniformity of the backlight viewing angle of the first backlight module and the display effect are improved.

BRIEF DESCRIPTION OF THE SEVERAL VIEWS OF THE DRAWINGS

In order to explain the technical solutions in the embodiments of the present invention more clearly, the following will briefly introduce the accompanying drawings needed in the description of the embodiments. Obviously, the accompanying drawings in the following description are merely some embodiments of the present invention. For those skilled in the art, other drawings can be obtained from these drawings without creative work.

DESCRIPTION OF SPECIFIC EMBODIMENTS OF THE INVENTION

Figure 1:
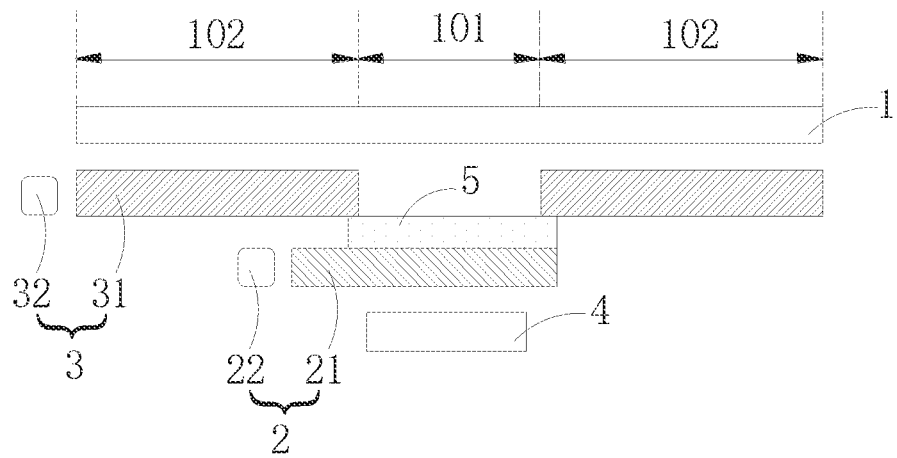
FIG. 1 is a schematic structural view of a first display device according to one embodiment of the present invention.

The description of the following embodiments refers to the attached drawings to illustrate specific embodiments that can be implemented in the present application. The directional terms mentioned in this application, such as "top," "down," "front," "back," "left," "right," "inner," "outer," "side," etc., are only for reference in the direction of the attached drawings. Therefore, the directional terms used are used to illustrate and understand the present application, rather than to limit the present application. In the drawings, units with similar structures are indicated by the same reference numerals.

Referring to FIG. 1, it is a schematic structural view of a first display device according to one embodiment of present invention.

A display device comprises a display panel 1, a first backlight module 2, a second backlight module 3, a light sensor 4, and a viewing angle adjusting component 5. The display panel 1 comprises at least one display sensing area 101 and a main display area 102 surrounding the display sensing area 101. The main display area 102 refers to an area mainly used to display images, and the display sensing area 101 refers to an area used to collect optical signals. The light sensor 4 may be a camera, a fingerprint recognition sensor, or other sensors, so that the display device can realize functions such as photographing and optical fingerprint recognition.

The first backlight module 2 comprises an optical element 21. At least a part of the optical element 21 completely faces the display sensing area 101, and the optical element 21 is configured to switch between a fog state and a transparent state. The optical element 21 may be a polymer dispersed liquid crystal (PDLC) dimming film or a polymer network liquid crystal (PNLC). The second backlight module 3 is disposed corresponding to the main display area 102. When the optical element 21 is in the fog state, the viewing angle adjusting component 5 is configured to adjust the exit angle of the backlight passing through the viewing angle adjusting component 5. When the optical element 21 is in the transparent state, external light enters the light sensor 4 through the viewing angle adjusting component 5 and the first backlight module 2, and the light sensor 4 functions.

It can be understood that the first backlight module 2 further comprises a first light source 22, and the second backlight module 3 comprises an optical film set 31 and a second light source 32. When the display device performs normal display, the optical element 21 is configured to switch to the fog state, the first light source 22 and the second light source 32 are both turned on, so the optical element 21 functions as a light guide plate, and the backlight emitted by the first light source 22 sequentially passes through the optical element 21 and the viewing angle adjusting component 5, and then injects into the display panel 1. The light emitted by the second light source 32 enters the display panel 1 through the optical film set 31. At this time, the display sensing area 101 and the main display area 102 both perform image display, which can realize full-screen display.

Figure 2:
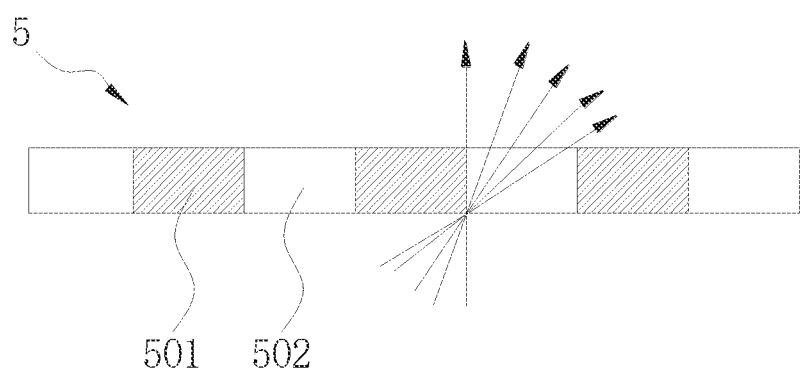
FIG. 2 is a simplified structural view of a viewing angle adjusting component when an optical element is in a fog state according to one embodiment of the present invention.

Referring to FIG. 2, it is a simplified structural view of the viewing angle adjusting component when the optical element is in the fog state according to one embodiment of the present invention.

The viewing angle adjusting component 5 comprises a dimming area 501 and a light transmitting area 502 that are alternately arranged at intervals.

When the optical element 21 is configured to switch to the fog state, the backlight emitted by the first light source 22 passes through the viewing angle adjusting component 5, the dimming area 501 which is opaque, and the light transmitting area 502 which is transparent, so that the exit direction of the backlight can be reduced, and the output caused by the first backlight can be reduced. The large viewing angle light intensity caused by the first backlight module 2 is conducive to shrink the viewing angle, thereby forming a uniform backlight for normal display.

When the light sensor 4 is working, the optical element 21 is configured to switch to the transparent state, the first light source 22 is turned off, the second light source 32 is turned on, and the backlight emitted by the second light source 32 enters the display panel 1 through the optical film set 31. When ambient light passes through the viewing angle adjusting component 5, both the dimming area 501 and the light transmitting area 502 are transparent, and the ambient light can reach the light sensor 4 through the optical element 21 and the viewing angle adjusting component 5. At this time, the main display area 102 performs image display, while the display sensing area 101 does not perform image display, and it can be used to realize functions such as taking pictures, so as to improve the uniformity of the backlight viewing angle of the first backlight module 2 without affecting the function of the light sensor 4, thereby improving the display effect.

Referring to FIG. 3 to FIG. 6, the viewing angle adjusting component 5 comprises a first substrate 51, a second substrate 52, a liquid crystal dye layer 53, a first electrode 54, a second electrode 55, and a transparent medium layer 56. The first substrate 51 and the second substrate 52 are disposed opposite to each other. The transparent medium layer 56 is disposed between the first substrate 51 and the second substrate 52. The transparent medium layer 56 is provided with a plurality of first through holes 561 arranged at intervals. The first through holes 561 are filled with the liquid crystal dye layer 53 to form a dimming structure 562, and the liquid crystal dye layer 53 comprises liquid crystal molecules 531 and dye molecules 532. The first electrode 54 is disposed on a side of the first substrate 51 facing the second substrate 52, and the second electrode 55 is disposed on a side of the second substrate 52 facing the first substrate 51.

Specifically, the first substrate 51 and the second substrate 52 are both transparent substrates, such as transparent glass substrates. The first electrode 54 and the second electrode 55 are both transparent electrodes. For example, the material of the first electrode 54 and the second electrode 55 may be transparent conductive materials such as indium tin oxide and indium zinc oxide.

It should be noted that the liquid crystal molecules 531 may simply refer to general indicator liquid crystal molecules, or may refer to polymer liquid crystals with a low polymer concentration. The liquid crystal molecules 531 are positive liquid crystal molecules or negative liquid crystal molecules, and the dye molecules 532 are positive dye molecules or negative dye molecules, including the following combinations, for example, the combination of positive liquid crystal molecules and positive dye molecules, the combination of negative liquid crystal molecules and negative dye molecules, the combination of positive liquid crystal molecules and negative dye molecules, and the combination of negative liquid crystal molecules and positive dye molecules. The dye molecules 532 are dichroic dye molecules, which absorb visible light differently along the longitudinal axis and the short axis. For positive dye molecules, when polarization direction of visible light being parallel to the longitudinal axis direction of the dye molecules 532 is incident on the dye molecules 532, the absorption rate of the dye molecules 532 for visible light reaches the maximum, and the light is almost completely absorbed. When polarization direction of the visible light being perpendicular to the longitudinal axis direction of the dye molecules 532 is incident on the dye molecules 532, the dye molecules 532 have almost no impact on the visible light.

As for negative dye molecules, when polarization direction of visible light being parallel to the longitudinal axis direction of the dye molecules 532 is incident on the dye molecules 532, the dye molecules 532 have almost no effect on the visible light. When polarization direction of the visible light being perpendicular to the longitudinal axis direction of the dye molecules 532 is incident on the dye molecules 532, the absorption rate of the dye molecules 532 for visible light reaches the maximum, and the light is almost completely absorbed.

The liquid crystal dye layer 53 is filled with the liquid crystal molecules 531 and the dye molecules 532, the dye molecules 532 and the liquid crystal molecules 531 are aligned in the same direction, and the longitudinal axis directions of the two are parallel to each other in the initial state. When the longitudinal axis direction of the liquid crystal molecules 531 rotates under an electric field, the longitudinal axis of the dye molecules 532 also rotates due to the guest-host effect.

The viewing angle adjusting component 5 provided by the embodiments of the present invention utilizes the above-mentioned properties of the liquid crystal molecules 531 and the dye molecules 532 to control the inversion of the liquid crystal molecules 531 through an electric field, and drive the dye molecules 532 to invert, so as to realize the dual-controllable state including a wide viewing angle mode and a narrow viewing angle mode, so that the normal display mode and the light sensor working mode do not interfere with each other.

Furthermore, the viewing angle adjusting component 5 further comprises a first alignment film and a second alignment film (not shown in the figure) for controlling the initial alignment direction of the liquid crystal molecules 531. The first alignment film is disposed on a side of the first electrode 54 facing the second substrate 52, and the second alignment film is disposed on a side of the second electrode 55 facing the first substrate 51. The alignment directions of the first alignment film and the second alignment film are the same, and may be horizontal alignment or vertical alignment.

When the first alignment film and the second alignment film are in a horizontal alignment, the initial alignment direction of the liquid crystal molecules 531 is the same as direction of the longitudinal axis of the liquid crystal molecules 531 which is parallel to the first substrate 51. When the first alignment film and the second alignment film are vertically aligned, the initial alignment direction of the liquid crystal molecules 531 is such that the longitudinal axis of the liquid crystal molecules 531 is perpendicular to the first substrate 51.

It should be noted that whether a voltage is applied to the first electrode 54 and the second electrode 55 to control the alignment direction of the liquid crystal molecules 531 depends on the alignment direction of the first alignment film and the second alignment film and the properties of the liquid crystal molecules 531, and it can be a combination of the two, for example, the liquid crystal molecules 531 are positive liquid crystal molecules, and the first alignment film and the second alignment film are horizontally aligned; the liquid crystal molecules 531 are negative liquid crystal molecules, the first alignment film and the second alignment film are horizontally aligned; the liquid crystal molecules 531 are positive liquid crystal molecules, and the first alignment film and the second alignment film are vertically aligned; the liquid crystal molecules 531 are negative liquid crystal molecules, and the first alignment film and the second alignment film are vertically aligned.

For the convenience of description, the embodiment of the present invention adopts the liquid crystal molecules 531 as positive liquid crystal molecules, and the first alignment film and the second alignment film are horizontally aligned as an example for explanation. For the working principle of the viewing angle adjusting component adopting the other cases listed above, please refer to the specific description about this case, and the embodiments of the present invention will not be detailed one by one.

Figure 3:
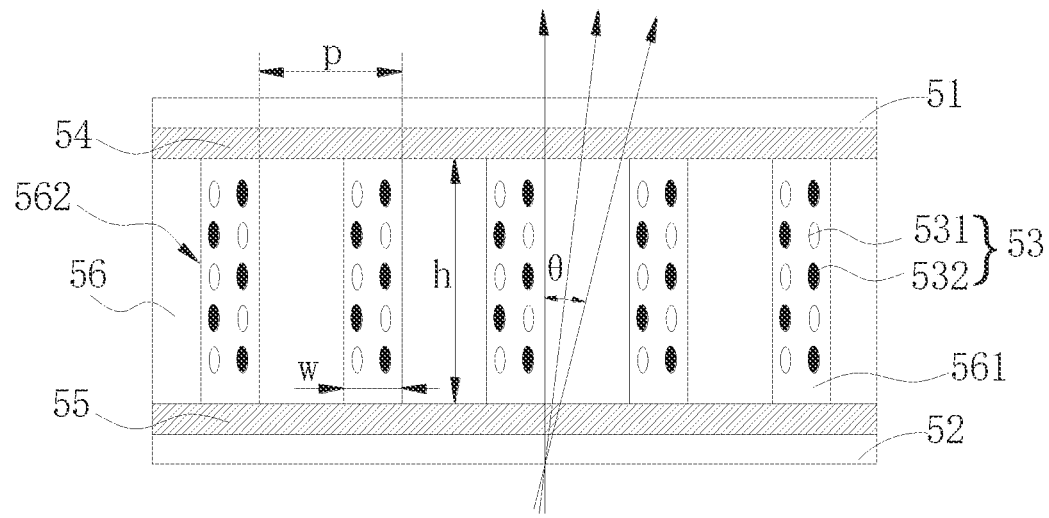
FIG. 3 is a schematic structural view of an optical element of a first viewing angle adjusting component in the fog state according to one embodiment of the present invention.
Figure 5:
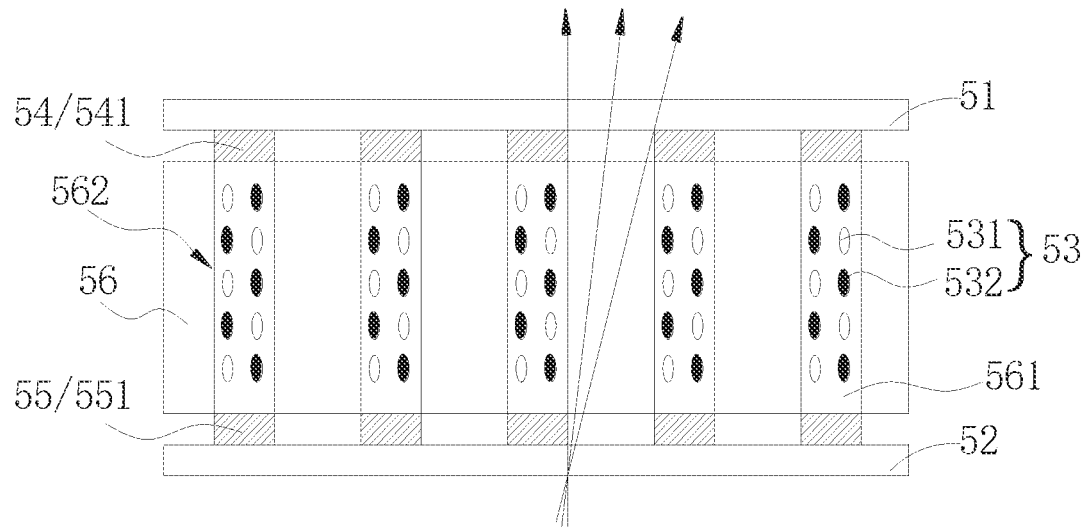
FIG. 5 is a schematic structural view of an optical element of a second viewing angle adjusting component in the transparent state according to one embodiment of the present invention.

Referring to FIG. 3 and FIG. 5, when the optical element 21 is in the fog state, a longitudinal axis of the liquid crystal molecules 531 in a plurality of the dimming structures 562 are perpendicular to the first substrate 51. Due to the guest-host effect, the longitudinal axis of the dye molecules 532 in the plurality of the dimming structures 562 is perpendicular to the first substrate 51, and a part of the backlight emitted by the first light source 22 will be absorbed by the dye molecules 532 in the dimming structures 562 and cannot pass through the viewing angle adjusting component 5, and thus it can achieve the purpose of narrowing the viewing angle. At this time, the viewing angle adjusting component 5 is in the narrow viewing angle mode.

In the narrow viewing angle mode, first, the display sensing area 101 can display images, and a better viewing angle effect can be obtained. Next, when the viewer views from a side of the display panel 1, the brightness of the screen is attenuated, and the screen becomes more blurred when viewed obliquely, and the display screen cannot be seen by the viewer, which can improve the anti-peeping effect. Furthermore, the viewing angle adjusting component 5 can absorb the backlight provided by the first backlight module 2 which enters the boundary between the main display area 102 and the display sensing area 101, and overcomes the viewing angle mismatch between the second backlight module 3 and the viewing angle adjusting component 5, which results in poor display effect, and thus the problem of the large viewing angle of the first backlight module 2 can be solved.

Figure 4:
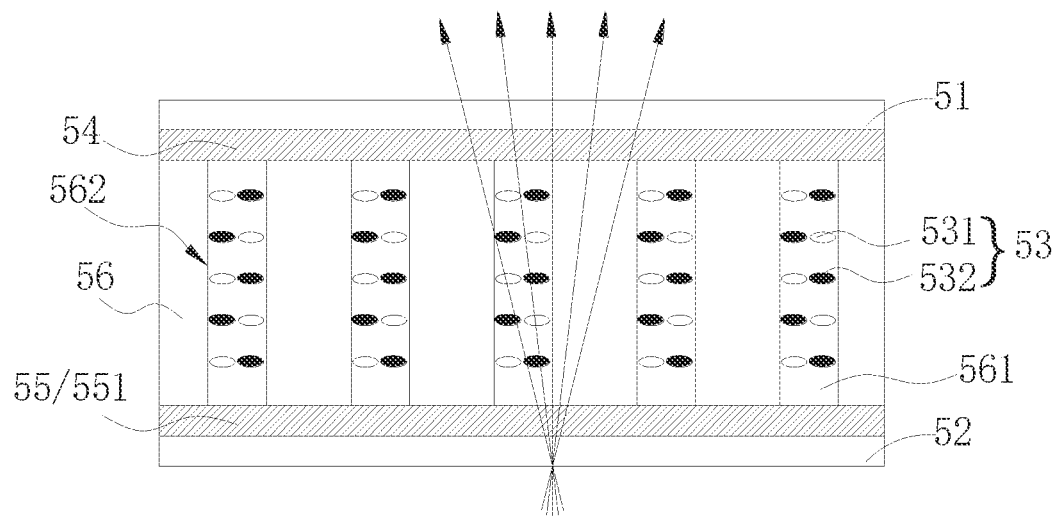
FIG. 4 is a schematic structural view of the optical element of the first viewing angle adjusting component in a transparent state according to one embodiment of the present invention.
Figure 6:
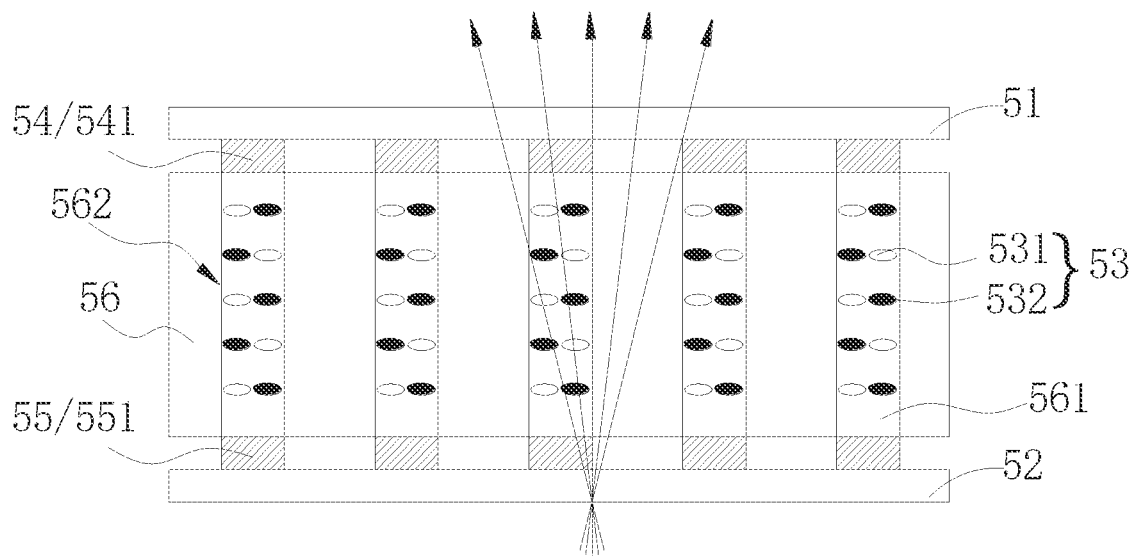
FIG. 6 is a schematic structural view of the optical element of the second viewing angle adjusting component in the fog state according to one embodiment of the present invention.

Referring to FIG. 4 and FIG. 6, when the optical element 21 is in the transparent state, the longitudinal axis of the liquid crystal molecules 531 in plurality of the dimming structures 562 is parallel to the first substrate 51. Due to the guest-host effect, the longitudinal axis of the dye molecules 532 in the plurality of the dimming structures 562 is parallel to the first substrate 51, and the dye molecules 532 in the plurality of the dimming structures 562 do not affect the backlight emitted by the first light source 22. At this time, the viewing angle adjusting component 5 is in the wide viewing angle mode.

In the wide viewing angle mode, the display sensing area 101 does not display images, which can effectively prevent the normal operation of the light sensor 4 from being affected. At this time, the viewing angle adjusting component 5 does not have any interference effect on the light sensor 4. The viewing angle adjusting component 5 can further diverge the ambient light. For example, when the light sensor 4 is a camera, it can reduce the brightness of the light during shooting, so as to reduce the impact on the imaging.

It is understandable that the liquid crystal dye layer 53 is disposed in a partial area between the first substrate 51 and the second substrate 52, and the first electrode 54 and the second electrode 55 of the present invention can be disposed in sections or on the entire surface.

In one embodiment, referring to FIG. 3 and FIG. 4, the first electrode 54 is disposed on a side of the first substrate 51 facing the second substrate 52, and the second electrode 54 is disposed on a side of the second substrate 52 facing the first substrate 51. In this embodiment, the first electrode 54 and the second electrode 55 are disposed on the entire surface, which can reduce steps of manufacturing process.

Referring to FIG. 3, when the optical element 21 is in the fog state, the first electrode 54 and the second electrode 55 are energized, and a vertical electric field is formed between the first electrode 54 and the second electrode 55. The liquid crystal molecules 531 in the plurality of the dimming structures 562 rotate under the vertical electric field, so that the longitudinal axis of the liquid crystal molecules 531 in the plurality of the dimming structures 562 is perpendicular to the first substrate 51. Due to the guest-host effect, the dye molecules 532 in the plurality of the dimming structures 562 rotate accordingly, and finally the longitudinal axis of the dye molecules 532 in the plurality of the dimming structures 562 is perpendicular to the first substrate 51. Therefore, part of the backlight emitted by the first light source 22 is absorbed by the dye molecules 532 in the dimming structures 562, and cannot pass through the viewing angle adjusting component 5, so that the objective of narrowing the viewing angle can be achieved. At this time, the viewing angle adjusting component 5 is in the narrow viewing angle mode.

Referring to FIG. 4, when the optical element 21 is in the transparent state, the first electrode 54 and the second electrode 55 are not energized, the longitudinal axis of the liquid crystal molecules 531 in the plurality of the dimming structures 562 is parallel to the first substrate 51, and the longitudinal axis of the dye molecules 532 in the plurality of the dimming structures 562 is parallel to the first substrate 51. Therefore, the dye molecules 532 in the plurality of the dimming structures 562 have no influence on the backlight emitted by the first light source 22. At this time, the viewing angle adjusting component 5 is in the wide viewing angle mode.

In another embodiment, as shown in FIG. 5 and FIG. 6, FIG. 5 and FIG. 6 are different from FIG. 3 and FIG. 4 in that: the first electrode 54 in FIG. 5 and FIG. 6 is disposed in sections on a side of the first substrate 51 facing the second substrate 52, and the second electrode 55 is disposed in sections on a side of the second substrate 52 facing the first substrate 51, which can save material and save product cost. Specifically, the side of the first substrate 51 facing the second substrate 52 is provided with a first electrode 54, and the side of the second substrate 52 facing the first substrate 51 is provided with a second electrode 55.

The first electrode 54 comprises a plurality of first sub-electrodes 541 arranged at intervals, the second electrode 55 comprises a plurality of second sub-electrodes 551 arranged at intervals, and each of the first sub-electrodes 541 is arranged corresponding to one of the second sub-electrodes 551, and the plurality of first sub-electrodes 541 and the plurality of second sub-electrodes 551 are disposed corresponding to the plurality of the dimming structures 562.

Referring to FIG. 5, when the optical element 21 is in the fog state, the first electrode 54 and the second electrode 55 are energized, and an electric field is formed between the first electrode 54 and the second electrode 55. The liquid crystal molecules 531 in the plurality of the dimming structures 562 rotate under the electric field, so that the longitudinal axis of the liquid crystal molecules 531 in the plurality of the dimming structures 562 is perpendicular to the first substrate 51. Due to the guest-host effect, the dye molecules 532 in the plurality of the dimming structures 562 rotate accordingly, and finally the longitudinal axis of the dye molecules 532 in the plurality of the dimming structures 562 is perpendicular to the first substrate 51. Therefore, part of the backlight emitted by the first light source 22 is absorbed by the dye molecules 532 in the dimming structures 562, and cannot pass through the viewing angle adjusting component 5, so that the objective of narrowing the viewing angle can be achieved. At this time, the viewing angle adjusting component 5 is in the narrow viewing angle mode.

Referring to FIG. 6, when the optical element 21 is in the transparent state, the first electrode 54 and the second electrode 55 are not energized, the longitudinal axis of the liquid crystal molecules 531 in the plurality of the dimming structures 562 is parallel to the first substrate 51, and the longitudinal axis of the dye molecules 532 in the plurality of the dimming structures 562 is parallel to the first substrate 51. Therefore, the dye molecules 532 in the plurality of the dimming structures 562 have no influence on the backlight emitted by the first light source 22. At this time, the viewing angle adjusting component 5 is in the wide viewing angle mode.

Specifically, the display device shown in FIG. 3 is taken as an example for description. The embodiment of the present invention can improve the viewing angle shrinkage of the viewing angle adjusting component 5 by designing different aspect ratios of the first through holes 561. For example, define a width of the first through holes 561 as w, and a period length of the first through holes 561 is p, a height of the first through holes 561 is h, and an aspect ratio of the first through holes 561 is h/w, so the contraction viewing angle $\theta = \arctan[(pw)/h]$, it can be seen that the shrinking viewing angle $\theta$ of the viewing angle adjusting component 5 depends on the aspect ratio of the first through holes 561, and different aspect ratios can be designed according to actual needs.

Figure 7:
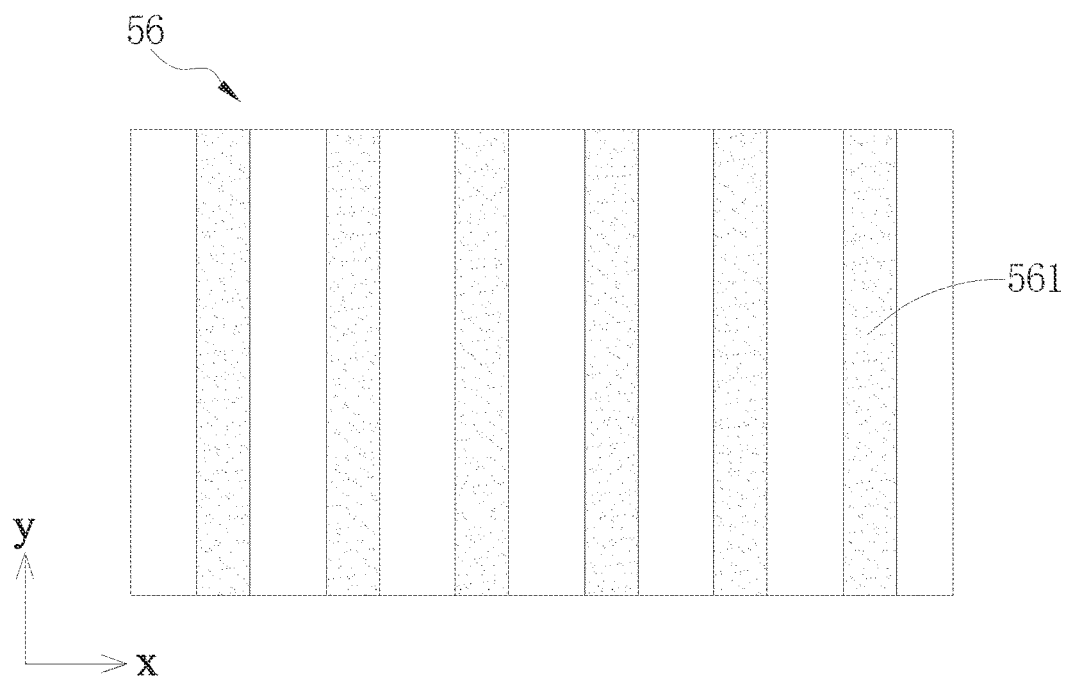
FIG. 7 is a first schematic structural top view of a transparent medium layer according to one embodiment of the present invention.

Referring to FIG. 7, an orthographic projection of the first through holes 561 on the transparent medium layer 56 is elongated and extends along a first direction x. A cross-sectional shape of the first through holes 561 may be a rectangle.

Figure 8:
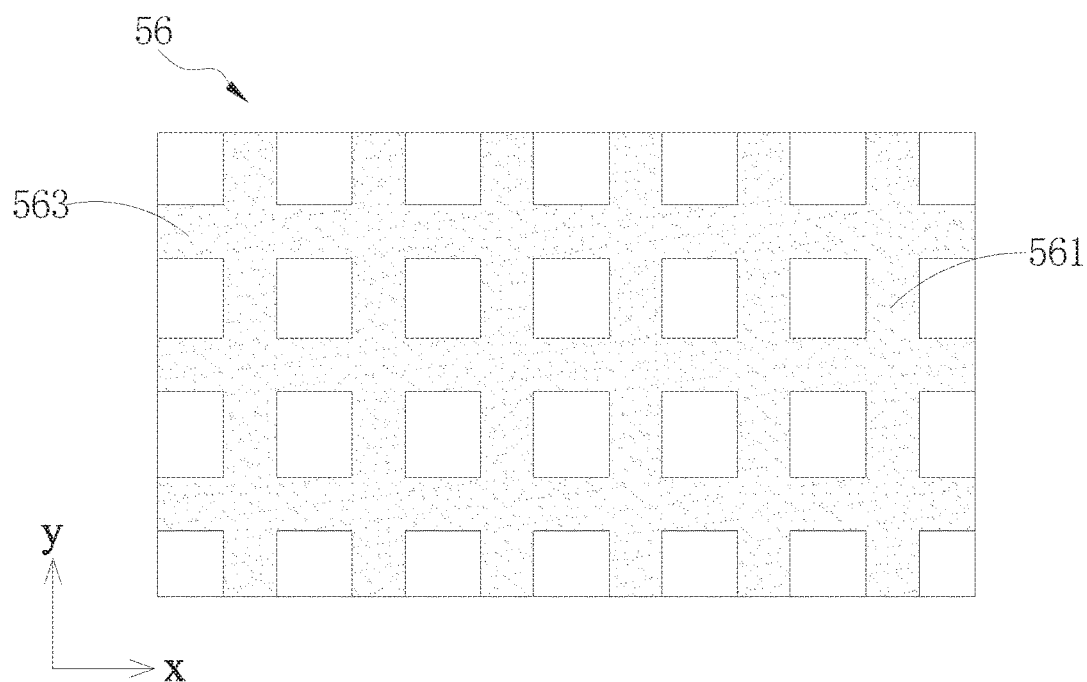
FIG. 8 is a second schematic structural top view of the transparent medium layer according to one embodiment of the present invention.

Furthermore, referring to FIG. 8, the difference between FIG. 8 and FIG. 7 is that the transparent medium layer 56 further comprises a plurality of second through holes 563, and each of the second through holes 563 crosses and communicates with a plurality of first through holes 561. A cross-sectional shape of the second through holes 563 may be a rectangle.

The first through holes 561 and the second through holes 563 are filled with the liquid crystal molecules 531 and the dye molecules 532 to form the dimming structure 562. When the optical element 21 is in the fog state, part of the backlight emitted by the first light source 22 will be absorbed by the dye molecules 532 in the dimming structure 562 corresponding to the first through holes 561 and the second through holes 563, which can further reduce the viewing angle.

The display device also comprises an upper polarizer and a lower polarizer (not shown in the figure). The upper polarizer is disposed on a side of the display panel 1 away from the first backlight module 2, and the lower polarizer is disposed on a side of the display panel 1 close to the first backlight module 2. The lower polarizer is disposed between the display panel 1 and the viewing angle adjusting component 5. In the transparent state, the longitudinal axis of the dye molecules 532 is parallel to a polarization direction of the lower polarizer, so the backlight absorption is not affected under large viewing angles.

There are many situations for the placement position of the viewing angle adjusting component 5, which will be explained one by one below.

Figure 9:
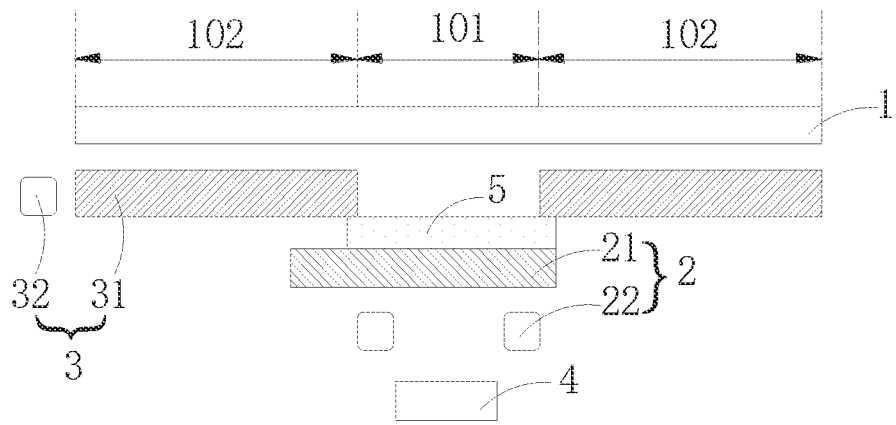
FIG. 9 is a schematic structural view of a second display device according to one embodiment of the present invention.
Figure 10:
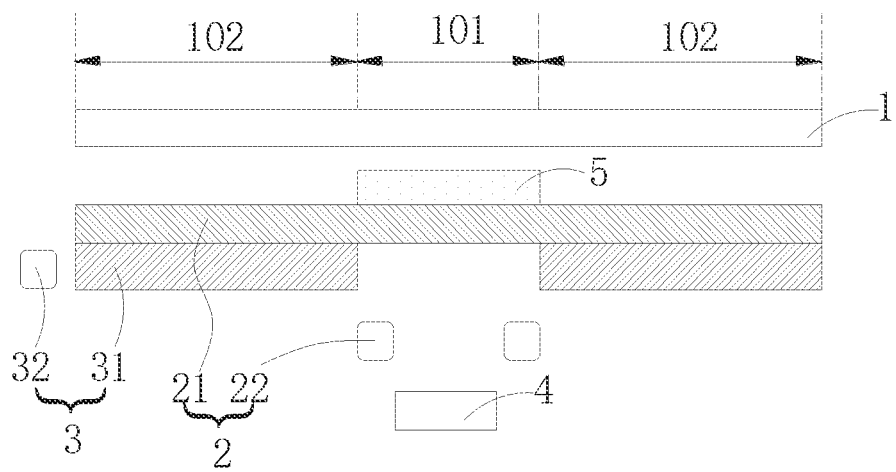
FIG. 10 is a schematic structural view of a third display device according to one embodiment of the present invention.

In one embodiment, referring to FIG. 1, FIG. 9, and FIG. 10, the viewing angle adjusting component 5 is located on a side of the optical element 21 close to the display panel 1, and the optical element 21 is located between the viewing angle adjusting component 5 and the light sensor 4. In the fog state, the light emitted by the first light source 22 propagates inside the optical element 21, then is adjusted by the viewing angle adjusting component 5, and finally enters the display panel 1 to achieve image display. In the transparent state, the ambient light passes through the viewing angle adjusting component 5 and the optical element 21 in order, and then enters the light sensor 4.

Figure 11:
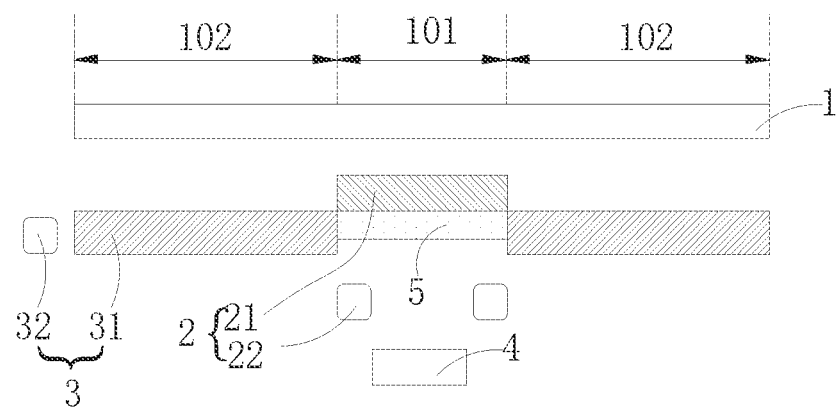
FIG. 11 is a schematic structural view of a fourth display device according to one embodiment of the present invention.
Figure 12:
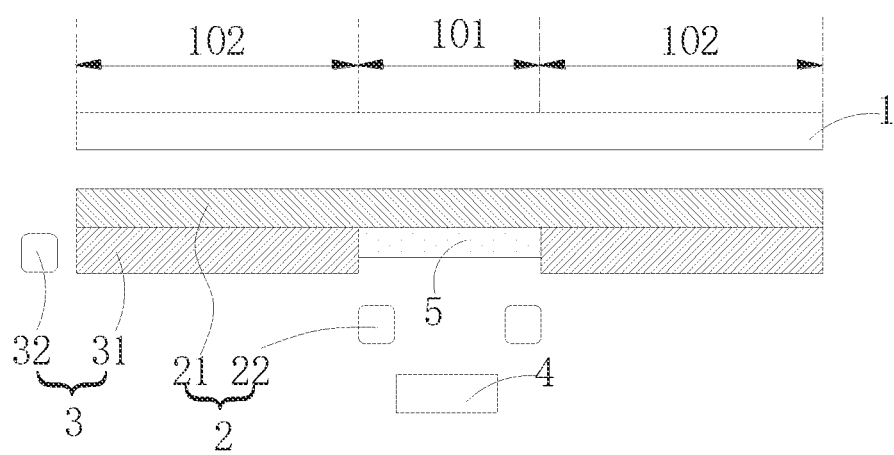
FIG. 12 is a schematic structural view of a fifth display device according to one embodiment of the present invention.

In one embodiment, referring to FIG. 11 and FIG. 12, the viewing angle adjusting component 5 is located on a side of the optical element 21 away from the display panel 1, and the viewing angle adjusting component 5 is located between the optical element 21 and the light sensor 4. In the fog state, the light emitted by the first light source 22 is adjusted by the viewing angle adjusting component 5, then enters the optical element 21 to propagate, and finally enters the display panel 1 to achieve image display. In the transparent state, the ambient light passes through the viewing angle adjusting component 5 and the optical element 21 in order, and then enters the light sensor 4.

The first light source 22 may be an edge-lit backlight. For example, referring to FIG. 1, the first light source 22 is disposed on a side of the optical element 21. For another example, referring to FIG. 9, FIG. 10, FIG. 11, and FIG. 12, the first light source 22 may also be a direct type backlight source, and the first light source 22 is disposed on a side of the optical element 21 away from the display panel 1.

Furthermore, referring to FIG. 10 and FIG. 12, the optical element 21 can be disposed corresponding to the main display area 102 and the display sensing area 101. The orthographic projection of the optical element 21 on the display panel 1 overlaps with the orthographic projection of the optical film set 31 on the display panel 1, which can make the viewing angle difference at the junction of the main display area 102 and the display sensing area 101 easier to handle, and thus it prevents other defects such as black spots on the screen. In this case, the first light source 22 may be a direct type backlight source to prevent affecting the normal display brightness of the main display area 102 during switching when an edge type backlight source is adopted.

The beneficial effect is that the display device provided by the embodiment of the present invention adopts the viewing angle adjusting component and first backlight module that can switch the viewing angle, and arranging the two in the display sensing area of the display panel, so as to solve the problem in the under-screen sensor technology that conventional display devices adopt a transparent backlight module, which easily causes uneven viewing angles when the picture is displayed.

The viewing angle adjusting component comprises an optical element, which can switch between the fog state and the transparent state. When the optical element is in the fog state, the viewing angle adjusting component can reduce the exit angle of the backlight through the viewing angle adjusting component, which improves the uniformity of the backlight viewing angle of the first backlight module, so as to improve the display effect. When the optical element is in the transparent state, external light enters the light sensor through the viewing angle adjusting component and the first backlight module to perform the function of the light sensor. Without affecting the function of the light sensor, the uniformity of the backlight viewing angle of the first backlight module and the display effect are improved.

In the above, the present application has been described in the above preferred embodiments, but the preferred embodiments are not intended to limit the scope of the invention, and a person skilled in the art may make various modifications without departing from the spirit and scope of the application. The scope of the present application is determined by claims.

What is claimed is:

1. A display device, comprising:
   a display panel comprising at least one display sensing area and a main display area surrounding the display sensing area;
   a first backlight module comprising an optical element, wherein at least a part of the optical element completely faces the display sensing area, and the optical element is configured to switch between a fog state and a transparent state;
   a second backlight module comprising an optical film set, wherein the optical film set is disposed corresponding to the main display area;
   a light sensor disposed on a side of the first backlight module away from the display panel and corresponding to the display sensing area; and
   a viewing angle adjusting component disposed between the display panel and the light sensor and corresponding to the display sensing area, wherein the viewing angle adjusting component comprises a dimming area and a light transmitting area that are alternately arranged at intervals;
   wherein when the optical element is in the fog state, the viewing angle adjusting component is configured to adjust an exit angle of backlight passing through the viewing angle adjusting component; and when the optical element is in the transparent state, external light enters the light sensor through the viewing angle adjusting component and the first backlight module, and the light sensor is working;

wherein the viewing angle adjusting component is located on a side of the optical element away from the display panel, and the viewing angle adjusting component is located between the optical element and the light sensor;

wherein the optical element is disposed corresponding to the main display area and the display sensing area.

2. The display device according to claim 1, wherein the viewing angle adjusting component comprises:
a first substrate;
a second substrate disposed opposite to the first substrate;
a transparent medium layer disposed between the first substrate and the second substrate, wherein the transparent medium layer is provided with a plurality of first through holes at intervals, and the plurality of first through holes are filled with a liquid crystal dye layer to form a dimming structure, the liquid crystal dye layer comprises liquid crystal molecules and dye molecules;
a first electrode disposed on a side of the first substrate facing the second substrate; and
a second electrode disposed on a side of the second substrate facing the first substrate;
wherein when the optical element is in the fog state, a longitudinal axis of the liquid crystal molecules in a plurality of the dimming structures are perpendicular to the first substrate; and when the optical element is in the transparent state, the longitudinal axis of the liquid crystal molecules in the plurality of the dimming structures are parallel to the first substrate.

3. The display device according to claim 2, wherein the first electrode comprises a plurality of first sub-electrodes arranged at intervals, the second electrode comprises a plurality of second sub-electrodes arranged at intervals, and each of the first sub-electrodes is arranged corresponding to one of the second sub-electrodes, and the plurality of first sub-electrodes and the plurality of second sub-electrodes are disposed corresponding to the plurality of the dimming structures.

4. The display device according to claim 2, wherein the transparent medium layer further comprises a plurality of second through holes, each of the second through holes intersects and communicates with the plurality of the first through holes, and the plurality of the first through holes and the second through holes are filled with the liquid crystal molecules and the dye molecules to form the dimming structures.

5. The display device according to claim 4, wherein an orthographic projection of each of the first through holes on the transparent medium layer is elongated and extends in a first direction, and an orthographic projection of each of the second through holes on the transparent medium layer is elongated and extends in a second direction; and
wherein the first direction and the second direction are perpendicular to each other.

6. The display device according to claim 2, wherein a shrinking viewing angle adjusted by the viewing angle adjusting component is $\theta=\arctan[(p-w)/h]$; and
wherein w is a width of the first through holes, p is a period length of the first through holes, and h is a height of the first through holes.

7. The display device according to claim 2, wherein the liquid crystal molecules are positive liquid crystal molecules or negative liquid crystal molecules, and the dye molecules are positive dye molecules or negative dye molecules.

8. A display device, comprising:
a display panel including at least one display sensing area and a main display area surrounding the display sensing area;
a first backlight module comprising an optical element, wherein at least a part of the optical element completely faces the display sensing area, and the optical element is configured to switch between a fog state and a transparent state;
a second backlight module comprising an optical film set, wherein the optical film set is disposed corresponding to the main display area;
a light sensor disposed on a side of the first backlight module away from the display panel and corresponding to the display sensing area; and
a viewing angle adjusting component disposed between the display panel and the light sensor and corresponding to the display sensing area;
wherein when the optical element is in the fog state, the viewing angle adjusting component is configured to adjust an exit angle of backlight passing through the viewing angle adjusting component; and when the optical element is in the transparent state, external light enters the light sensor through the viewing angle adjusting component and the first backlight module, and the light sensor is working;
wherein the viewing angle adjusting component is located on a side of the optical element away from the display panel, and the viewing angle adjusting component is located between the optical element and the light sensor;
wherein the optical element is disposed corresponding to the main display area and the display sensing area.

9. The display device according to claim 8, wherein the viewing angle adjusting component comprises:
a first substrate;
a second substrate disposed opposite to the first substrate;
a transparent medium layer disposed between the first substrate and the second substrate, wherein the transparent medium layer is provided with a plurality of first through holes at intervals, and the plurality of first through holes are filled with a liquid crystal dye layer to form a dimming structure, the liquid crystal dye layer comprises liquid crystal molecules and dye molecules;
a first electrode disposed on a side of the first substrate facing the second substrate; and
a second electrode disposed on a side of the second substrate facing the first substrate;
wherein when the optical element is in the fog state, a longitudinal axis of the liquid crystal molecules in a plurality of the dimming structures are perpendicular to the first substrate; and when the optical element is in the transparent state, the longitudinal axis of the liquid crystal molecules in the plurality of the dimming structures are parallel to the first substrate.

10. The display device according to claim 9, wherein the first electrode comprises a plurality of first sub-electrodes arranged at intervals, the second electrode comprises a plurality of second sub-electrodes arranged at intervals, and each of the first sub-electrodes is arranged corresponding to one of the second sub-electrodes, and the plurality of first sub-electrodes and the plurality of second sub-electrodes are disposed corresponding to the plurality of the dimming structures.

11. The display device according to claim 9, wherein the transparent medium layer further comprises a plurality of second through holes, each of the second through holes intersects and communicates with the plurality of first through holes, and the plurality of first through holes and the second through holes are filled with the liquid crystal molecules and the dye molecules to form the dimming structures.

12. The display device according to claim 11, wherein an orthographic projection of each of the first through holes on the transparent medium layer is elongated and extends in a first direction, and an orthographic projection of each of the second through holes on the transparent medium layer is elongated and extends in a second direction; and
wherein the first direction and the second direction are perpendicular to each other.

13. The display device according to claim 9, wherein a shrinking viewing angle adjusted by the viewing angle adjusting component is $\theta=\arctan[(p-w)/h]$; and
wherein w is a width of the first through holes, p is a period length of the first through holes, and h is a height of the first through holes.

14. The display device according to claim 9, wherein the liquid crystal molecules are positive liquid crystal molecules or negative liquid crystal molecules, and the dye molecules are positive dye molecules or negative dye molecules.

\* \* \* \* \*